J. L. FRITZ.
Reissued June 24, 1913. PRIMING DEVICE FOR CARBURETERS. 13,580.
APPLICATION FILED APR. 26, 1913.
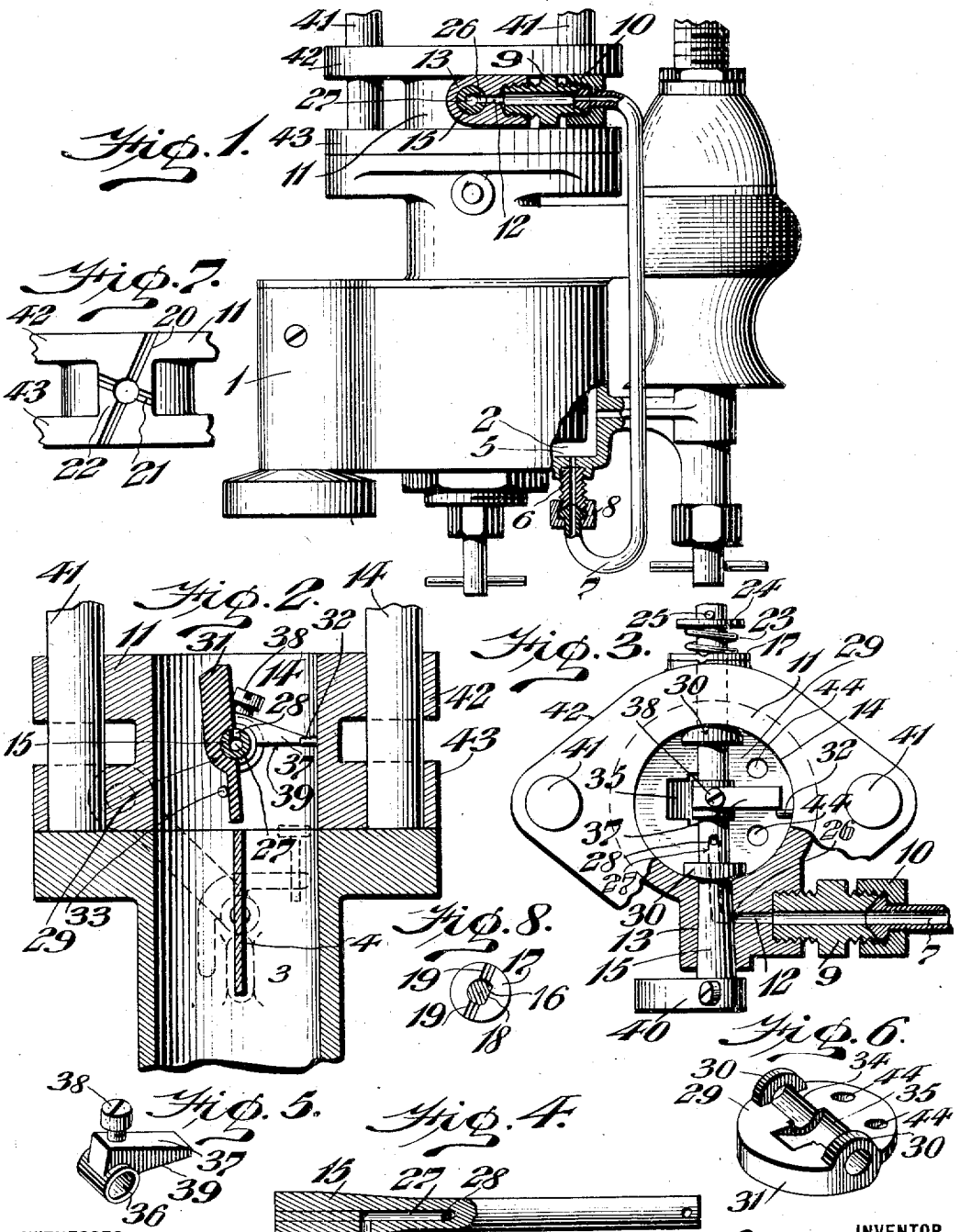
WITNESSES
H. G. Dieterich
L. Courville.
INVENTOR
Julius L. Fritz.
BY Riedersheim & Fairbanks.
ATTORNEYS

UNITED STATES PATENT OFFICE.

JULIUS L. FRITZ, OF PHILADELPHIA, PENNSYLVANIA, ASSIGNOR OF ONE-HALF TO AMOS H. OMAN, OF PHILADELPHIA, PENNSYLVANIA.

PRIMING DEVICE FOR CARBURETERS.

13,580. Specification of Reissued Letters Patent. Reissued June 24, 1913.

Original No. 1,048,518, dated December 31, 1912, Serial No. 677,812. Application for reissue filed April 26, 1913. Serial No. 763,[illegible]

*To all whom it may concern:*

Be it known that I, JULIUS L. FRITZ, a citizen of the United States, resident of the city and county of Philadelphia and State of Pennsylvania, have invented a new and useful Priming Device for Carbureters, of which the following is a specification, the principle of the invention being herein explained and the best mode in which I have contemplated applying that principle, so as to distinguish it from other inventions.

My present invention relates to an automatic priming device which is designed to be located between the carbureter and the intake manifold of an internal combustion engine, and is adapted to be employed in conjunction with any of the usual or conventional type of carbureters, and for the purpose of illustration, I have shown the same as employed in conjunction with a carbureter such as is disclosed and broadly claimed in my prior Patent No. 993,770, granted to me on the 30th day of May, 1911, although, as is evident, the same is not limited to use with the type of carbureter illustrated, but may be employed to advantage in conjunction with any desired or conventional type of carbureter.

In carbureters as heretofore constructed, considerable difficulty has arisen, especially in extreme cold weather, in starting an internal combustion engine, such as, for example, the types employed in conjunction with motor vehicles, and although in some instances it has been proposed to employ a by-pass for admitting an additional supply of fuel to the manifold, the desired results have not been obtained, since proper mechanism has not been provided to automatically control the requisite amount of explosive mixture at the proper time.

With the above in view, my present invention consists in its broad and generic scope of a novel construction of an automatic priming device adapted to be employed in conjunction with any desired type of carbureter.

It further consists of a novel construction of an automatic priming device, whereby novel means are provided for introducing additional fuel into the intake leading to the manifold, and novel means for controlling the admission of such additional fuel.

It further consists of a novel construction of an automatic priming device wherein a novel construction of valve mechanism is employed to automatically control admission of additional fuel and air into the manifold when it is desired to start the engine.

It further consists of a novel construction of a valve which is counterbalanced in such a manner as to normally remain closed, but adapted to be opened by the suction of the engine, novel means being provided for limiting the movement of said valve and also for securing said valve in its open position so that when the valve is in open position, the supply of fuel is automatically cut down so that a compensating mixture is continuously maintained in accordance with the speed of the motor.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a side elevation partly broken away, of a carbureter, in conjunction with which an automatic priming device embodying my invention, is employed. Fig. 2 represents a sectional elevation of a portion of Fig. 1. Fig. 3 represents a plan view partly in section of Fig. 1. Fig. 4 represents a side elevation partly in section of the fuel valve. Fig. 5 represents a perspective view of a portion of the air valve controlling mechanism. Fig. 6 represents a perspective view of the compensating valve. Fig. 7 represents a side elevation of a portion of the casing 11 showing the interlocking grooves. Fig. 8 represents a rear elevation of the locking washer and the valve on which it is mounted, the latter being shown in section.

Similar numerals of reference indicate corresponding parts in the figures.

Referring to the drawings:—For purpose of illustration, I have shown my novel automatic priming device as employed in conjunction with a construction, such as is shown in my prior Patent No. 993,770, and since the construction and operation of the same are well known to those skilled in this art, a detailed description thereof is unnecessary.

1 designates a carbureter of any desired or conventional type having a float chamber 2.

3 designates a passage leading from the mixing chamber of the carbureter to the intake manifold, said passage being provided with a throttle valve 4, which is constructed and operates in the manner well known in this art.

5 designates a port communicating with the float chamber 2 and with a nipple 6, which latter is secured in fluid tight condition with respect to a conduit 7 by means of a coupling nut 8, said conduit 7 communicating with a nipple 9 and being secured with respect thereto by means of a coupling 10, said nipple 9 being in threaded engagement with a casing or second manifold 11, having a port 12 therein communicating with the nipple 9.

It will of course be apparent that while in the present instance the by-pass 7 and its adjuncts and the second manifold 11 are shown as being separate from the carbureter casing, that in practice such by-pass would preferably extend through the carbureter casing, and the second manifold 11 would also be preferably constructed integral with the carbureter casing. The casing or manifold 11 is provided with a passage 13 therethrough, which communicates with a passage 14 extending through said casing 11 and communicating with the passage 3, leading from the mixing chamber and also communicating with the intake manifold of the engine.

15 designates a valve which is preferably conical or tapered at one end and rotatably mounted in the passage 13. The valve 15 is faced off as indicated at 16 in order that a locking washer 17 may interlock therewith, since the aperture 18 in said washer conforms to the contour of the end of the valve 15. The washer 17 on its under face is provided with a rib or lug 19, which is adapted to seat in a groove 20 or in a groove 21, as will be understood by reference to Figs. 3, 7 and 8, the casing 11 being flattened as at 22 in order to provide a seat for the locking washer 17.

23 designates a spring interposed between the locking washer 17 and a washer 24, which latter is maintained in assembled position with respect to the valve 15 by means of a pin 25 passing through the valve 15.

The valve 15 is provided with a port 26 adapted at certain times to register with the port 12 and communicate with a passage 27, which latter communicates by means of a port 28 with the passage 14. The body portion of the valve 15 is preferably rounded, see Fig. 4, thereby forming a journal for a compensating valve 29, provided with the apertured lugs or ears 30, through which the valve 15 passes. One side of the valve is counterbalanced or weighted, as indicated at 31 and the movement of this valve may be limited in any desired manner, and in the present instance I have shown the same as being accomplished by providing a pin 32, which serves as a stop to maintain the compensating valve 29 normally in a closed position. In order to limit the rotation of the valve 29 in a reverse direction, I provide any desired means, such as, for example, a pin 33, which serves as a stop to prevent the valve 29 passing beyond its extreme open position. The valve 29 in the present instance is laterally recessed as at 34 to form a bearing for a portion of the valve 15. The valve 29 is also recessed as at 35 in order that the shaft may pass through the sleeve 36 of the arm 37, which latter is provided with a set screw 38, whereby the arm 37 is fixedly secured to the valve 15, it being understood that the valve 29 is loosely mounted on the valve 15. The under face of the arm 37 is shown for purposes of illustration as being radial, as indicated at 39 in order that the same will engage with the upper face of the valve 29 and cause the same to be rotated on the rotation in the proper direction of the valve 15, which latter has secured thereto in any desired manner, an arm 40, which is adapted to have secured thereto a suitable operating connection, not shown, which extends to a position accessible to the operator.

In the present instance, I have shown the casing 11 as secured in assembled position by means of bolts or studs 41, passing through flanges 42 and 43.

44 designates one or more ports through the valve 29, in order to provide for the easy opening of the same. Owing to the provision of the apertures 44, the valve is unbalanced and it is thereby rendered possible for the air acting on the same to cause the tilting movement.

In the operation, if the arm 40 is actuated to bring the port 26 in the valve out of register with the port 12, then the arm 37 bearing against the unweighted end of the valve 29 will cause the latter to revolve with the valve 15 until the same engages the stop 33, and since the by-pass 7 is now cut out, the carbureter will operate in its usual manner. If, however, the valve 15 is actuated to bring the same into working position, then the port 26 will register with the port 12, and a direct communication will be formed between the float chamber and the intake to the manifold. This will bring the parts into the position seen in Fig. 3. Assuming now that the engine is turned over or started, the suction will cause a supply of rich fuel to be drawn, from the float chamber 2 through the by-pass 7 and through the ports 26 and 28 into the passage 14 communicating with the intake of the manifold, and the suction of the motor will cause the compensating valve 29 to automatically open, thereby providing for the admission of additional air to keep the engine running, and if the valve 29 is moved to its wide-open position, then it will close either wholly or in part the port 28, and thus automatically cut down the supply of additional fuel, and a compensating mixture of fuel and air is thus constantly maintained in accordance with the speed of the engine.

Any desired means may be employed to prevent improper movement of the parts when the valve 15 is rotated, it being understood that when the parts are in their normal position, as indicated in Fig. 3, the rib 19 of the locking washer 17 will be seated in the groove 20, while when the compensating valve 29 is in its wide-open position, seen in Fig. 2, the rib 19 of the locking washer 17, will be seated in the groove 21, and thereby prevent any accidental displacement of the valve 15 when once adjusted, it being understood that such a construction illustrates but one of many ways of accomplishing this result. The washer 17 and its adjuncts provide means for visibly indicating the position of the valve 16.

Special attention is directed to the novel construction of the valve 15 and the novel manner in which the valve 29 and the arm 37 coöperate therewith. I have found in practice it is advantageous to employ in conjunction with a by-pass communicating with a float chamber and a passage leading from the mixing chamber of the carbureter to the intake manifold, means automatically controlled by the suction of the engine for controlling such by-pass and also the admission of additional air, and devices for rendering said means operative or inoperative.

It will be apparent that by varying the amount of rotation imparted to the valve 15, or by varying the location of the pin 33, or by varying the location of the coacting grooves 20 and 21 and the rib 19 and the washer 17, that the port 28 may be entirely closed when the valve 29 is in its wide-open position, or the opening of the port increased or diminished in accordance with the requirements met with in practice.

The operation of the carbureter *per se* is the same as that disclosed in my prior Patent #993,770, granted to me on the 30th day of May, 1911, and since the same is well known to those skilled in this art, a detailed description of the construction and operation thereof is unnecessary, it being apparent that my device may be employed in conjunction with any desired type of carbureter.

It will now be apparent that I have devised a novel and useful construction of a priming device for carbureters, which embodies the features of advantage enumerated as desirable in the statement of the invention and the above description, and while I have, in the present instance, shown and described a preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In an automatic priming device, the combination with a carbureter having a fuel supply in direct connection with a passage leading to the intake manifold of an internal combustion engine, of a valve controlling the flow of fuel from the supply to said passage, and devices controlling the flow of air and fuel through said passage adapted to be opened for air by the engine suction and to automatically close for fuel on a predetermined increase of the suction and the amount of opening of said devices inversely varying the amount of air and fuel.

2. In an automatic priming device, the combination with a carbureter having a float chamber and a passage leading to the intake manifold of an internal combustion engine, of a fuel conduit communicating with said chamber and said passage, a valve controlling said conduit, and a second valve controlling the flow of air and fuel through said conduit and adapted to be opened for air by the engine suction and to automatically close for air when said suction ceases and close for fuel at a predetermined increase of the suction.

3. In an automatic priming device, the combination with a carbureter having a float chamber and a passage leading to the intake manifold of an internal combustion engine, of a fuel conduit communicating with said chamber and said passage, a valve controlling said conduit, and a second valve controlling the flow of fuel and air through said conduit and adapted to be opened for air by the engine suction and to automatically close for air when said suction ceases and close for fuel at a predetermined increase of the suction, and devices for limiting the movement of said second valve.

4. In an automatic priming device, the combination with a carbureter having a float chamber and a passage leading to the intake manifold of an internal combustion engine, of a fuel conduit communicating with said chamber and said passage, a valve controlling said conduit, a second valve controlling the flow of air through said passage and fuel through said conduit and adapted to be opened for air by the engine suction and to automatically close for air when said suction ceases and close for fuel at a predetermined increase of the suction, and means for rendering the first valve inoperative.

5. In an automatic priming device, the combination with a carbureter having a float chamber and a passage leading to the intake manifold of an internal combustion engine, of a fuel conduit communicating with said chamber and said passage, a valve controlling said conduit, a second valve controlling the passage of air and fuel through said conduit and adapted to be opened for air by the engine suction and to automatically close for air when said suction ceases and close for fuel at a predetermined increase of the suction, and means for rendering the second valve inoperative.

6. In an automatic priming device, the combination with a carbureter having a float chamber and a passage leading to the intake manifold of an internal combustion engine, of a conduit communicating with said chamber and said passage, a valve controlling said conduit, and a counterbalanced compensating valve loosely mounted on and controlling said first valve.

7. In an automatic priming device, the combination with a carbureter having a float chamber and a passage leading to the intake manifold of an internal combustion engine, of a conduit communicating with said chamber and said passage, a valve controlling said conduit, and a compensating valve loosely mounted on said first valve and counterbalanced to provide for the automatic closing of the same, said compensating valve varying the amount of fuel passing through said first valve and also controlling admission of air to said passage.

8. In an automatic priming device, in combination with a carbureter having a float chamber and a passage leading to the intake of an internal combustion engine, of a by-pass communicating with the float chamber and said passage, a counterbalanced valve rotatably mounted and adapted to vary the amount of fuel entering said passage, and devices for rendering said counterbalanced valve inoperative.

9. In an automatic priming device, a carbureter having a fuel supply and a passage leading to the intake manifold of an internal combustion engine, a by-pass communicating with said fuel supply and said passage, a valve having an inlet port communicating with said conduit and having a discharge port within said passage, a counterbalanced valve rotatably mounted and adapted to automatically close and to be opened by the engine suction, and means for actuating said first valve to render the counterbalanced valve inoperative.

10. In an automatic priming device, a carbureter having a fuel supply and a passage leading to the intake manifold of an internal combustion engine, a by-pass communicating with said fuel supply and said passage, a valve having an inlet port communicating with said conduit and having a discharge port within said passage, a counterbalanced valve rotatably mounted and adapted to automatically close and to be opened by the engine suction, means for actuating said first valve to render the counterbalanced valve inoperative, and devices for visibly indicating the operative and inoperative condition of said valve.

11. In an automatic priming device, the combination with a carbureter having a fuel supply and a passage leading therefrom to the intake manifold of an internal combustion engine, of a conduit communicating with said fuel and with said passage, a valve rotatably mounted and controlling admission of fuel from said conduit into said passage, and a compensating valve loosely mounted on said first valve and having means for causing the same to automatically close, said compensating valve being opened by the engine suction.

12. In an automatic priming device, a carbureter having a fuel supply and a passage leading from the mixing chamber to an internal combustion engine, a valve rotatably mounted and having a port opening into said passage, a by-pass communicating with said port and with said fuel supply, a compensating valve loosely mounted on said first valve and controlling the port therein and operated by engine suction, and a connection for manually actuating said first valve.

13. In an automatic priming device, a carbureter having a fuel supply and a passage leading from the mixing chamber to an internal combustion engine, a valve rotatably mounted and having a port opening into said passage, a by-pass communicating with said port and with said fuel supply, a compensating valve loosely mounted on said first valve and controlling the port therein and operated by engine suction and closing said port when in wide open position, and a connection for manually actuating said first valve.

14. In an automatic priming device, a carbureter casing having a fuel supply and a passage leading from the mixing chamber to an internal combustion engine, a valve having a conical bearing rotatably mounted in said casing and having a port communicating with said passage, a compensating valve loosely mounted on said valve and controlling the port therein, means for manually actuating said first valve, and devices carried by said first valve and interlocking with the casing to visibly indicate the position of said first valve.

15. In an automatic priming device, a carbureter having a fuel supply and a passage leading from the mixing chamber to an internal combustion engine, a valve rotatably mounted and having a port opening into said passage, a by-pass communicating with said port and with said fuel supply, a compensating valve loosely mounted on said first valve and controlling the port therein and operated by engine suction, a connection for manually actuating said first valve, and a throttle valve in said passage anterior to said valves.

16. In an automatic priming device, a carbureter having a fuel supply and a passage leading from the mixing chamber to an internal combustion engine, a valve rotatably mounted and having a port opening into said passage, a by-pass communicating with said port and with said fuel supply, an apertured compensating valve loosely mounted on said first valve and controlling the port therein and operated by engine suction, an arm adjustable on said first valve and engaging said compensating valve, and a connection for manually actuating said first valve.

JULIUS L. FRITZ.

Witnesses:
H. S. FAIRBANKS,
A. H. OMAN.